(12) United States Patent
Espinoza et al.

(10) Patent No.: US 11,259,501 B2
(45) Date of Patent: Mar. 1, 2022

(54) WARNING SYSTEM FOR ANIMAL FARROWING OPERATIONS

(71) Applicant: SwineTech, Inc., New Sharon, IA (US)

(72) Inventors: Abraham Espinoza, Iowa City, IA (US); Matthew Rooda, Iowa City, IA (US); John Rourke, Cedar Rapids, IA (US)

(73) Assignee: SWINETECH, INC., New Sharon, IA (US)

( * ) Notice: Subject to any disclaimer, the term of this patent is extended or adjusted under 35 U.S.C. 154(b) by 655 days.

(21) Appl. No.: 15/751,924

(22) PCT Filed: Sep. 28, 2016

(86) PCT No.: PCT/US2016/054145
§ 371 (c)(1),
(2) Date: Feb. 12, 2018

(87) PCT Pub. No.: WO2017/058893
PCT Pub. Date: Apr. 6, 2017

(65) Prior Publication Data
US 2018/0228131 A1 Aug. 16, 2018

Related U.S. Application Data

(60) Provisional application No. 62/350,021, filed on Jun. 14, 2016, provisional application No. 62/234,449, filed on Sep. 29, 2015.

(51) Int. Cl.
*A01K 29/00* (2006.01)
*H04B 15/02* (2006.01)
(Continued)

(52) U.S. Cl.
CPC .......... *A01K 29/005* (2013.01); *A01K 1/0218* (2013.01); *G10L 15/20* (2013.01);
(Continued)

(58) Field of Classification Search
CPC .. A01K 29/005; A01K 27/009; A01K 1/0218; A01K 1/0209; A01K 7/06; A01K 15/029; G10L 25/51; G10L 17/26
(Continued)

(56) References Cited

U.S. PATENT DOCUMENTS

| | | | | |
|---|---|---|---|---|
| 585,525 | A * | 6/1897 | Kellogg | A61B 7/02 381/67 |
| 4,651,677 | A * | 3/1987 | de Wit | A61D 17/008 119/505 |

(Continued)

FOREIGN PATENT DOCUMENTS

| | | |
|---|---|---|
| CA | 2540832 A1 | 9/2007 |
| CN | 202819238 U | 3/2013 |

(Continued)

OTHER PUBLICATIONS

International Search Report and Written Opinion dated Feb. 3, 2017 for counterpart PCT Application No. PCT/US2016/054145.
(Continued)

*Primary Examiner* — Peter M Poon
*Assistant Examiner* — Jeffrey R Larsen
(74) *Attorney, Agent, or Firm* — Shuttleworth & Ingersoll, PLC; Jason R. Sytsma (57) ABSTRACT

A vibratory detector for detecting a vibratory signal from one or more feeders. A processor is in communication with the vibratory detector and configured for determining from at least one characteristic of the vibratory signal a possible action event, and for determining from a pattern of possible action events a likely action event. A warning device is in communication with the processor for providing an output in response to the likely action event. In an embodiment, the at least one characteristic of the vibratory signal can comprise the frequency or magnitude of the vibratory signal.

20 Claims, 6 Drawing Sheets

(51) Int. Cl.
*A01K 1/02* (2006.01)
*G10L 15/20* (2006.01)
*G10L 25/51* (2013.01)
*G10L 25/48* (2013.01)

(52) U.S. Cl.
CPC .............. *H04B 15/02* (2013.01); *G10L 25/48* (2013.01); *G10L 25/51* (2013.01)

(58) Field of Classification Search
USPC ................................ 119/859, 718, 792, 856
See application file for complete search history.

(56) References Cited

U.S. PATENT DOCUMENTS

| | | | |
|---|---|---|---|
| 5,228,449 | A | 7/1993 | Christ et al. |
| 5,778,082 | A * | 7/1998 | Chu .......................... H04N 7/15 348/14.07 |
| 6,535,131 | B1 * | 3/2003 | Bar-Shalom ......... A01K 11/008 340/573.1 |
| 6,681,023 | B1 * | 1/2004 | Turnbull ................ H04R 1/342 381/338 |
| 7,970,734 | B2 | 6/2011 | Townsend et al. |
| 8,317,720 | B2 | 11/2012 | Laurence et al. |
| 2002/0010390 | A1 | 1/2002 | Guice et al. |
| 2003/0125946 | A1 * | 7/2003 | Hsu ......................... G10L 17/26 704/246 |
| 2004/0107104 | A1 * | 6/2004 | Schaphorst ........... G10L 15/183 704/270 |
| 2006/0011144 | A1 * | 1/2006 | Kates ....................... G01S 13/86 119/719 |
| 2006/0022723 | A1 | 2/2006 | Canada et al. |
| 2008/0121168 | A1 | 5/2008 | Ryznar et al. |
| 2009/0052692 | A1 | 2/2009 | Wang et al. |
| 2009/0191521 | A1 * | 7/2009 | Paul ........................ G10L 17/16 434/169 |
| 2010/0000395 | A1 * | 1/2010 | Walker, II ............ G10H 1/0008 84/616 |
| 2010/0254558 | A1 | 10/2010 | Meyer et al. |
| 2011/0313555 | A1 * | 12/2011 | Shoham ............. G08B 21/0208 700/94 |
| 2012/0108989 | A1 | 5/2012 | Gargiulo et al. |
| 2012/0130711 | A1 * | 5/2012 | Yamabe .................. G10L 25/78 704/231 |
| 2012/0177229 | A1 | 7/2012 | Lorenz et al. |
| 2012/0245933 | A1 | 9/2012 | Flaks et al. |
| 2013/0279703 | A1 * | 10/2013 | Goldstein .............. H04R 29/00 381/56 |
| 2014/0174376 | A1 * | 6/2014 | Touchton ............... G08B 23/00 119/719 |
| 2014/0350351 | A1 | 11/2014 | Halperin et al. |
| 2014/0350927 | A1 | 11/2014 | Yamabe et al. |

FOREIGN PATENT DOCUMENTS

| | | |
|---|---|---|
| CN | 103918604 A | 7/2014 |
| CN | 103999780 A | 8/2014 |
| CN | 203786351 U | 8/2014 |
| CN | 104026029 A | 9/2014 |
| CN | 104026069 A | 9/2014 |
| CN | 203884379 U | 10/2014 |
| CN | 104366089 A | 2/2015 |
| CN | 204540277 U | 8/2015 |
| CN | 204695065 U | 10/2015 |
| CN | 204695066 U | 10/2015 |
| CN | 105285397 A | 2/2016 |
| CN | 105340826 A | 2/2016 |
| CN | 105341400 A | 2/2016 |
| CN | 205124689 U | 4/2016 |
| CN | 105594599 A | 5/2016 |
| CN | 205727542 U | 11/2016 |
| DE | 102013221266 A1 | 4/2014 |
| WO | WO2008154662 A1 | 12/2008 |
| WO | WO2014118788 A2 | 8/2014 |
| WO | WO2015083153 A2 | 6/2015 |

OTHER PUBLICATIONS

Tekvet Technologies, Livestock Health Monitoring Systems, "What is the TekVet Health Monitoring System", screen print of web page at http://www.tekvet.com/index.phpoption=com_contents view=article id=6, 2015.
Mexican Office Action dated Dec. 16, 2019 for counterpart Mexican Patent Application No. MX/a/2018/003163.
Canadian Office Action dated Nov. 12, 2019 for counterpart Canadian Patent Application No. 2,996,010.
Genzow et al., "Monitoring of a commercial fattening herd by means of the Pig Cough Monitor and oral fluid diagnostics", Jun. 8, 2014.
Canadian Office Action dated Dec. 10, 2018 for counterpart Canadian Patent Application No. 2,996,010.
Mexican Office Action dated Jul. 9, 2019 for counterpart Mexican Application No. MX/a/2018/003163.
Ferrari S., et al.; "Cough sound analysis to identify respiratory infection in pigs", Computers and Electronics in Agriculture, Elsevier, Amsterdam, NL, vol. 64, No. 2, Dec. 2008, pp. 318-325.
Canadian Office Action dated Oct. 22, 2021 for counterpart Canadian Patent Application No. 2,996,010.
Canadian Office Action dated Dec. 10, 2020 for counterpart Canadian Patent Application No. 2,996,010.
Brazilian Office Action reported in an email dated Sep. 4, 2020 for counterpart Brazilian Patent Application No. PI 112018006244-8.
Chinese Office Action dated Apr. 28, 2021 for counterpart Chinese Patent Application No. 201680057001.7.
Mexican Office Action dated Jul. 6, 2021 for counterpart Mexican Patent Application No. MX/a/2018/003163.
Mexican Office Action dated Nov. 10, 2020 for counterpart Mexican Patent Application No. MX/a/2018/003163.

* cited by examiner

WARNING SYSTEM FOR ANIMAL FARROWING OPERATIONS

CROSS-REFERENCE TO A RELATED APPLICATION

This application is the National Phase of International Application PCT/US2016/054145 filed Sep. 28, 2016 which designated the U.S. This application claims priority to U.S. Provisional Patent Application Ser. No. 62/234,449, entitled "Sow Alerting Device" filed Sep. 29, 2015, and U.S. Provisional Patent Application Ser. No. 62/350,021, entitled "Sow Alerting Device" filed Jun. 14, 2016, the disclosures of which are hereby incorporated by reference in their entirety.

BACKGROUND

This disclosure relates to a warning system for animal farrowing operations, and more specifically, this disclosure relates to a system with a vibratory detector and pattern recognition to identify when a feeder, (e.g., a nursing piglet) is in danger of being crushed by its mother.

In animal farrowing, there is always the problem of the mother crushing the newly born feeder when the mother lies down or when, while lying down, she changes from one position to another; for example, pre-weaned piglet mortality, as a result of being crushed by the sow in a farrowing enclosure, accounts for a 7% to 10% loss of all piglets that are farrowed. This loss translates into reduced potential profits for the pork producer.

Attempts have been made to solve this problem with electrical or electronic sensing and warning devices that detect noise from the squealing feeder followed by an electric shock to the mother to cause her to switch positions, hopefully off of the endangered feeder. Such devices have previously relied on a stored acoustical signal of a squealing feeder to compare with the sound from the endangered, squealing feeder. Feeders, however, rarely make the same sound, especially as they age (even from day to day after birth) or across breeds. A piglet, for example, that is one day old sounds very different than a piglet two, three, or four days old. Piglets of different breeds sound different too. Furthermore, when such devices are put into practice where there are dozens of sows and hundreds of piglets in an enclosed confinement building comprising a myriad of structures, concrete floor, and aluminum and steel siding and frame, the acoustics of the confinement building present a non-trivial problem to overcome.

SUMMARY

Disclosed is a warning system and method for preventing injury to feeders by a mother in an animal farrowing location. The system includes a vibratory detector for detecting a vibratory signal from one or more feeders. A processor is in communication with the vibratory detector and configured for determining from at least one characteristic of the vibratory signal a possible action event, and for determining from a pattern of possible action events a likely action event. A warning device is in communication with the processor for providing an output in response to the likely action event. In an embodiment, the at least one characteristic of the vibratory signal can comprise the frequency or magnitude of the vibratory signal.

An analog-to-digital converter ("ADC") can be provided for digitizing the vibratory signal from the vibratory detector to create a digitized vibratory signal. A time-to-frequency domain ("TFD") converter can also be provided for converting the digitized vibratory signal to a frequency domain representation of the digitized vibratory signal.

In the system and method, a possible action event can be determined from the frequency domain representation of the digitized vibratory signal. A possible action event can occur when the peak magnitude of the plurality of frequency bands is a multiple of the relative magnitude of the plurality of frequency bands and when the peak energy is a multiple of the relative magnitude of the plurality of frequency bands, and when the average amplitude is a percent greater than the average amplitude. In one implementation, the peak magnitude of the plurality of frequency bands is four time the relative magnitude of the plurality of frequency bands, the peak energy is three times the relative magnitude of the plurality of frequency bands, and the average amplitude is at least fifty percent greater than the average amplitude.

From a collection of possible action events, the system can examine for a pattern of possible action events that are indicative of a likely action event. The pattern can be in the form of a predetermined average number of feeder squeal events and feeder non-squeal events per second. In one implementation, the predetermined average number of feeder squeal events and feeder non-squeal events per second is at least five-sixths and less than or equal to two-and-one-half, for a period of time not less than five seconds and not more than fifteen seconds.

DETAILED DESCRIPTION

Disclosed is a system and method for preventing injury to feeders by a mother in an animal farrowing location. Feeder(s) throughout this disclosure refers to a baby animal, such as a piglet, calf, lamb or the like that is nursing from its mother. The system is intended to reduce the incidence of feeder mortality due to "lay-ons" (i.e., when a feeder is underneath the mother and becomes trapped when she lies down). This is accomplished by stimulating the mother to stand up with an irritation, such as a physical irritation like an electric shock or vibration, or an auditory or visual irritation, when the system or method detects a likely action event, such as a squeal, tremor, convulsion, etc., that is indicative of the feeder being in danger. The illustrated embodiment with accompanying disclosure is directed to detecting a piglet squeal that is indicative of the piglet being laid upon by its mother, with the understanding that the system and method herein described are applicable for other types of nursing animals in a time period from birth until weaning, corresponding to the farrowing period in swine operations.

It has been found that a piglet in distress from being laid upon squeals with a specific frequency, magnitude and duration in a specific pattern. The system and method herein described detects a likely action event (e.g., piglet squeals that are indicative of the piglet being laid upon by its mother) from a pattern of possible action events (e.g., squeals with at least one characteristic indicative of the piglet being laid upon by its mother, wherein the characteristics are frequency, magnitude, and duration of the squeal). The pattern is a predetermined number of cycles between a feeder squeal event, and a feeder non-squeal event where a feeder squeal event refers to the sound that a piglet makes in distress from being laid upon and a feeder non-squeal event refers to a breath or other noise or squeal from a piglet not indicative of a squeal event of a piglet being laid upon.

With respect to a particular breed of domesticated piglets, it has been found that the predetermined number of cycles of squeal events and non-squeal events to indicate a likely action event is at least seven and less than or equal to twenty in eight seconds. This predetermined pattern between squeal events and non-squeal events may hold true for all, some, or no other breeds of piglets and other feeders; however, one skilled in the art would recognize and be able to adapt the predetermined number of cycles of squeal events and non-squeal events to correspond with other breeds of piglets or other types of feeders, if necessary. Based on this pattern of predetermined number of cycles of squeal events and non-squeal events, the system and method can react with the cooperation of a warning device to provide an output to the mother in response to the likely action event.

Figure 1:
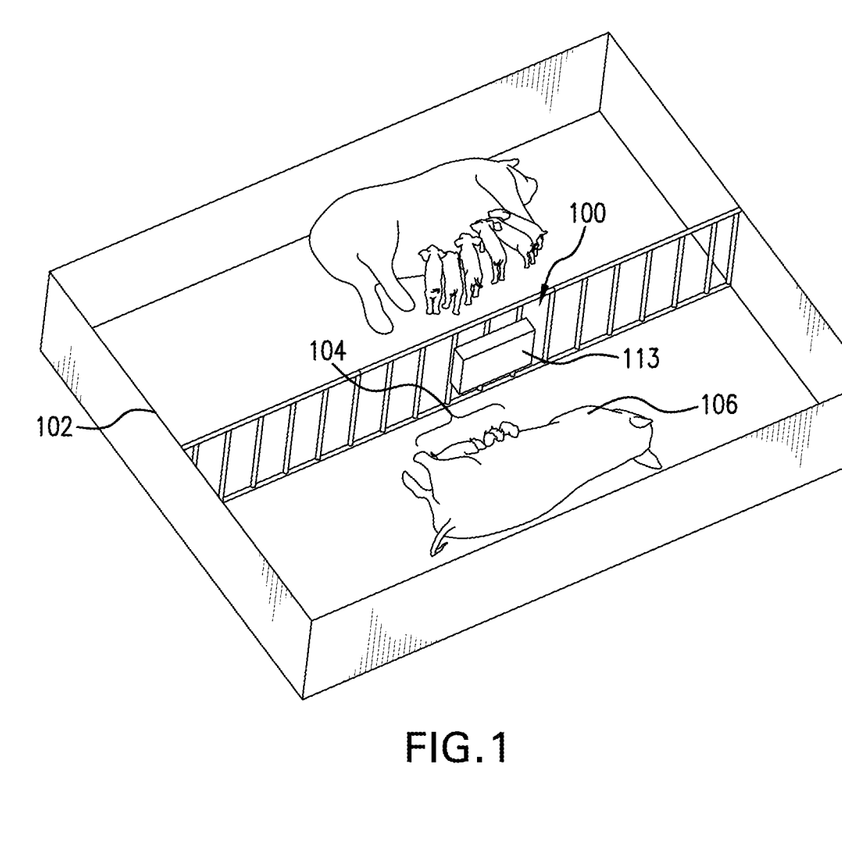
FIG. 1 is a diagrammatic view of a farrowing pen with a warning system for preventing injury to feeders by a mother in an animal farrowing location.

FIG. 1 shows a diagrammatic view of a farrowing pen 102 with a warning system 100 for preventing injury to feeders 104 by a mother 106 in an animal farrowing location.

Figure 2:
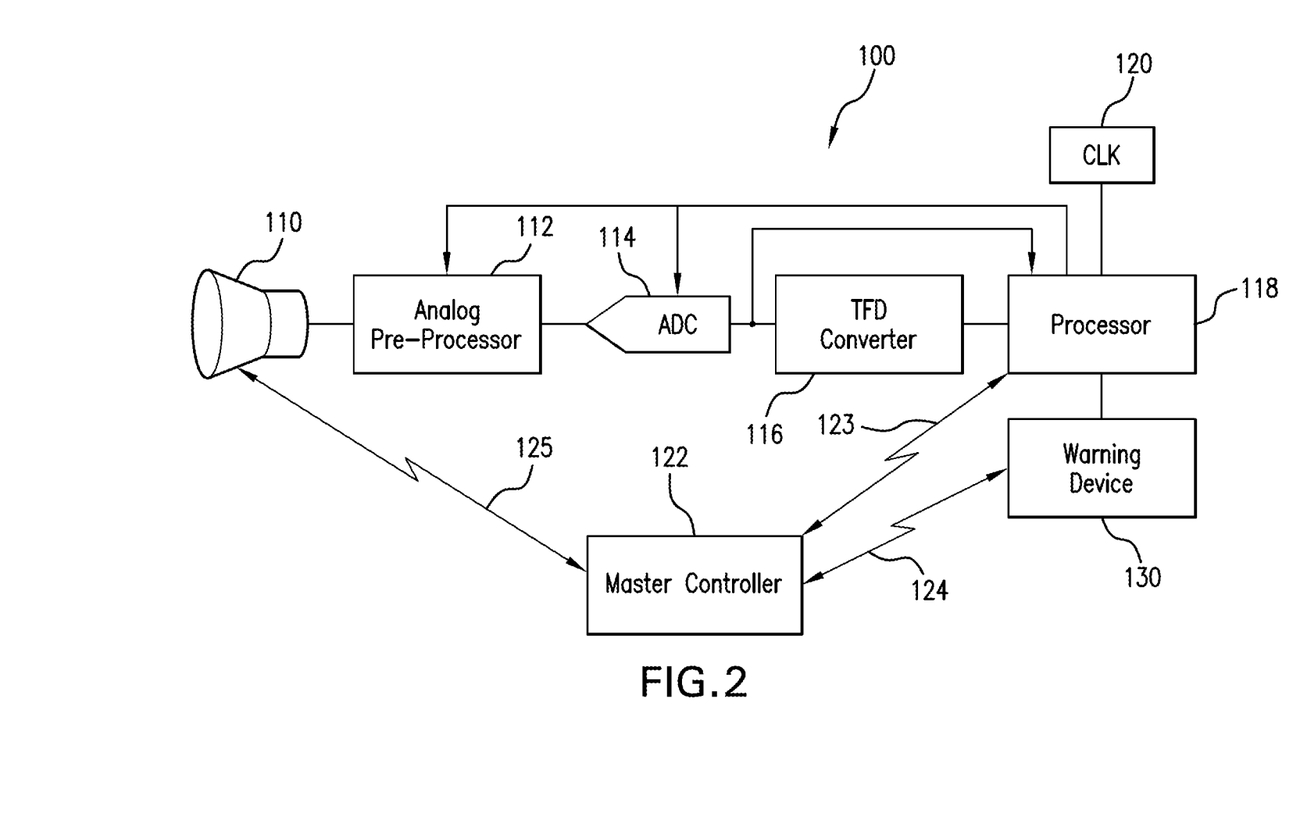
FIG. 2 is a block diagram of the system for preventing injury to feeders by a mother in an animal farrowing location shown generally in FIG. 1.

FIG. 2 shows a block diagram of warning system 100 of FIG. 1. Warning system 100 includes a vibratory detector 110 that detects a vibratory signal from one or more feeders 104 in farrowing pen 102. Vibratory detector 110 can be a microphone, laser, accelerometer, strain gauge or other type of vibratory sensor that responds to acoustic pressure or vibration created by feeders 104 when squealing. In the illustrated embodiment, vibratory detector 110 can be one or two microphones positioned near feeders 104 in a portable housing 113 (shown in FIG. 1).

An analog preprocessor 112 preprocesses the vibratory signal detected by vibratory detector 110 before it is converted into a digital signal by an analog-to-digital convertor ("ADC") 114. Analog preprocessor 112 can include any number of analog devices, such as a series of low pass or band-pass filters tuned for a pass-bad corresponding substantially to the frequency range for the squealing piglet (1500 to 4500 Hertz for a domesticated piglet (and any value in between), and amplifiers, such as a low-noise amplifier (LNA) to enhance noise figure performance of the remaining circuitry to further help define the vibratory signal and filter ambient acoustical signals, which may heterodyne onto the target signal. In addition, if the signal is very weak, other conventional signal processing equipment, such as a lock-in amplifier could be used to pull the signal out of the background noise. Alternatively, analog preprocessor 112 can be omitted and the vibratory signal can be sufficiently enhanced through digital signal processing techniques, including digital filtering and amplification. A closed loop system between a processor 118 (discussed below) and analog preprocessor 112 can provide feedback to dynamically modify the filtering characteristics of analog preprocessor 112 to improve squeal detection.

The digital representation of the vibratory signal is processed by a time-to-frequency domain (TFD) converter 116 to derive the frequency contents of the vibratory signal. TFD converter 116 is preprogrammed with instructions for performing a Fourier spectral analysis, such as an FFT (Fast Fourier Transform) or FHT (Fast Hartley Transform), or any other Fourier series decomposition technique. The frequency contents of the vibratory signal are transposed in approximately forty bands of frequencies extending throughout the range of interest of 1500 to 4500 Hertz (Hz) corresponding to the acoustical range of a piglet. The number of bands depends upon the sampling frequency. Other feeders 104 may have a different acoustical range.

A processor 118 is provided for processing the spectral representation of the vibratory signal in the form of a frequency-domain representation of a digitized vibratory signal from ADC 114. The frequency-domain representation of the digitized vibratory signal when decomposed by TFD 116 with an FFT transform function at a sampling rate of 44,100 and 256 samples per set produces 128 frequency bins (wherein a bin is a spectrum sample that defines the frequency resolution). Any useful information relating to a feeder squeal event or a feeder non-squeal event will be found in the bins of interest. With a sampling rate of 44.1K Sa/s and 256 samples, the first forty bins (approximately) comprise the bins of interest. These bins of interest comprise a conversion set that is used for analysis.

A clock 120 provides to processor 118 timing information for the frequency-domain representation of the digitized vibratory signal. The timing information includes a time stamp, which can be to the nearest one-ten-thousandth of a second for each conversion set.

Processor 118 is configured for determining from at least one characteristic of the vibratory signal a possible action event. The characteristics of the vibratory signal can be the frequency, magnitude, and duration of the vibratory signal, or any combination of two or more of those characteristics. In one implementation, from the frequency-domain representation of the digitized vibratory signal, a possible action event can be calculated by processor 118 from a relative magnitude of a plurality of frequency bands from the frequency-domain representation of the digitized vibratory signal. In this regard, the possible action event can occur when (i) the peak magnitude of the plurality of frequency bands is a multiple of the relative magnitude of the plurality of frequency bands from the frequency-domain representation of the digitized vibratory signal, (ii) the peak energy of the frequency-domain representation of the digitized vibratory signal is a multiple of the relative magnitude of the plurality of frequency bands from the frequency-domain representation of the digitized vibratory signal, and (iii) the average amplitude of the frequency domain representation of the digitized vibratory signal is a greater percentage than an average amplitude for a plurality of prior frequency domain representations of the digitized vibratory signal. In one implementation, the peak magnitude of the plurality of frequency bands is four time the relative magnitude of the plurality of frequency bands, the peak energy is three times the relative magnitude of the plurality of frequency bands, and the average amplitude is at least fifty percent greater than the average amplitude.

The conversion set comprising of the bins of interest can also include time domain information, comprising of an average and a peak sound pressure level of the vibratory signal before conversion into the frequency-domain representation of a digitized vibratory signal.

Also, included in the conversion set are other frequency-domain data comprising of the average magnitude of all the frequency bands in the conversion set, the actual magnitudes of each of the predefined targeted band of frequencies (e.g., the 1500 to 4500 Hz frequency range), the average magnitude of all the frequency bands ("average magnitude"), the average magnitude of the targeted frequency bands (e.g., 1500-4500 Hz) ("average target magnitude"), and the peak magnitude of any of the targeted frequency bands ("peak magnitude"), wherein the "band number" of the frequency band which contained the peak magnitude is the "peak band." The average of the magnitude of three frequency bands centered on the peak band contains information about the average energy related to the peak band.

A data smoothing function can be used to reduce the large amount of random measurement error and smooth out the data to remove glitches and other stray artifacts and noise from the signal. Each possible action event is grouped chronologically to create a parametric time slice. The parametric time slice can be any length of time sufficient to reduce the measurement error, glitches, stray artifacts and noise. In one implementation, a parametric time slice is less than or equal to 0.1 seconds, which depends on the speed of the processor. From each parametric time slice, a sum of possible action events can be determined from the average values of the parameters discussed above that are in each conversion set. A buffer is provided to store the sum of possible action events from the successive parametric time slices to create a time-domain representation of the possible action events, which is used to determine the likely action events. In one implementation, the buffer continually stores data from the last eight seconds (but preferably no less than five seconds or more than fifteen seconds), and processor 118 determines the likely action event from the pattern of possible action events contained within the buffer.

Processor 118 can provide data from the buffer back to the analog pre-processor to adjust for noise or other signal artifacts found in the contents of the buffer. The sequence of parametric time slices can be subjected to a secondary TFD process, which then determines that a likely action event is occurring if there is a peak frequency anywhere in the range 0.4 to 1.2 Hz, and if the magnitude of that peak frequency is at least three times the average magnitude of all the frequency bands in that secondary TFD process.

Figure 5A:
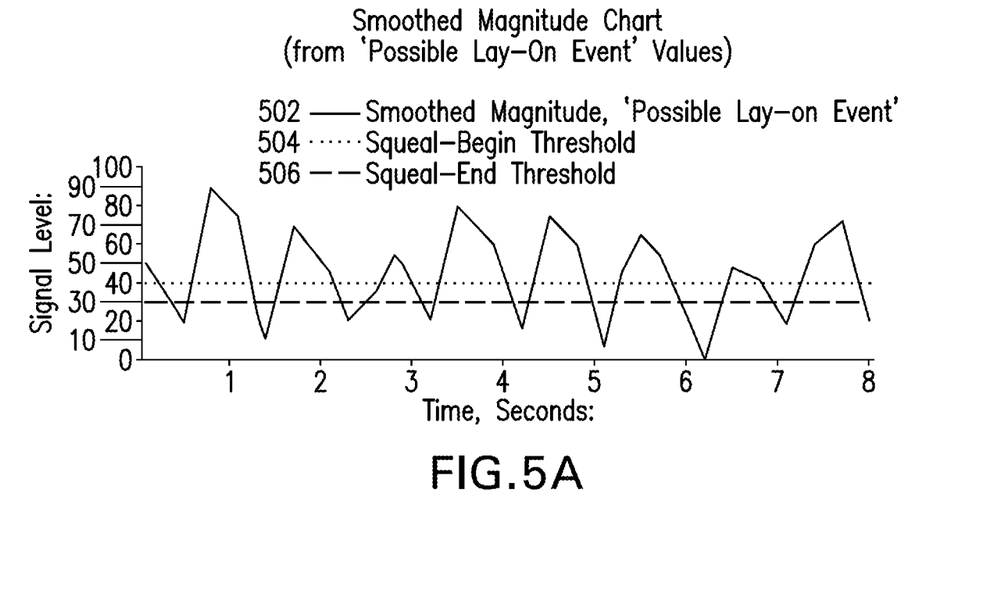
FIG. 5A is a smoothed magnitude waveform of possible action events.
Figure 5B:
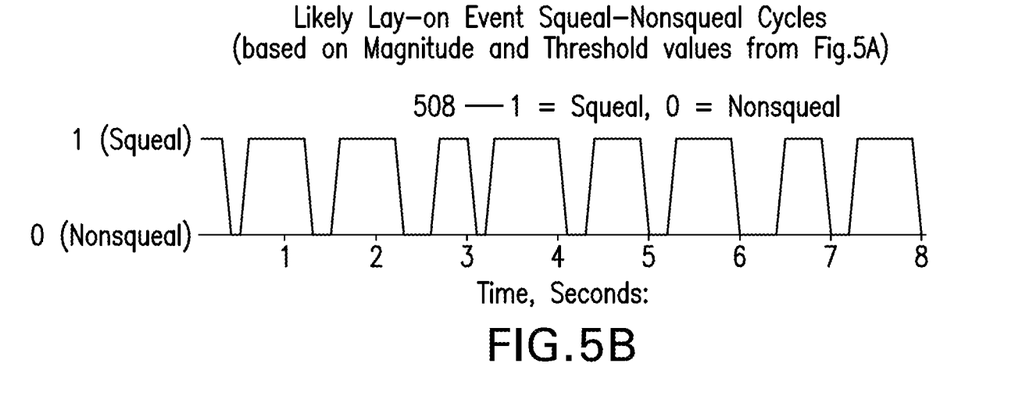
FIG. 5B is a likely action event of a 'squeal'-'non-squeal' signal.

In another implementation, the contents of the buffer can be reviewed in the time-domain to identify a likely action event. With reference to FIGS. 5A and 5B, a signal level 502, a squeal-begin threshold level 504, and a squeal-end threshold level 506 are shown in FIG. 5A, and the 'squeal'-'non-squeal' signal 508 is shown in FIG. 5B. A likely action event occurs according to the following pattern: (i) signal level 502 increases to a level that is greater than the programmable and predetermined action event (e.g. 'lay-on squeal') squeal-begin threshold level 504 for a period of time; during this time, there is a timer ('squeal timer') that starts counting the time slices for a 'squeal'; (ii) the signal level decreases to a level that is less than the programmable and predetermined action event (e.g. 'lay-on breath') squeal-end threshold level 506 (which is always less than the threshold for a squeal-begin 504, to allow for hysteresis), there is a timer ('non-squeal timer') that starts counting time slices for a 'non-squeal;' and (iii) after all time slices in the buffer have been processed, the total number of 'squeal'-'non-squeal' cycles in 'squeal'-'non-squeal' signal 508 are checked by processor 118 to determine whether the number of cycles is at least 0.4 squeals but no more than 1.2 squeals per second (or any range in between), for the sequence of time slices in the buffer comprising no less than a five second or more than fifteen second timespan (or any range in-between) into the past from the current time.

Processor 118 can perform error checking on the likely action event so that the probability of a likely action event is more certain. Upon a likely action event (e.g., when there are between 7 and 20 (inclusive) 'squeal'-'non-squeal' cycles), two or more factors can be checked: (i) whether the average 'squeal'-to-'non-squeal' ratio is at least one (i.e., the non-squeal is of shorter duration than the squeal); and (ii) whether the peak length of a 'squeal'-'non-squeal' cycle is no more than 1.5 times the length of the average 'squeal'-'non-squeal' cycle in this sequence. If the answer to these two factors is yes, then there is an increased probability that the likely action event is an actual action event, i.e. that the likely action event corresponds to an actual lay-on of the squealing feeder.

Warning system 100 further comprises of a warning device 130 in communication with processor 118 for providing an output in response to the likely action event. Warning device 130 stimulates the mother to stand up with an irritation such as an electric shock or vibration, or an auditory or visual irritation. In one implementation, warning device 130 comprises of a "prod" with at least one electrode in contact with the skin of the mother to deliver an electric shock. Warning device 130 can be configured to deliver a multi-stage output wherein a first stage output is an initial irritation to the mother, wherein a second stage output is a stronger irritation. The initial and stronger irritations can be any combination of a vibration or an electric shock.

Warning device 130 can comprise a bi-directional transceiver for communication with processor 118 over a connection 123 for communicating to processor 118 an "I'm Okay" signal indicative of warning device functioning properly. The "I'm Okay" signal can also provide a confirmation to processor 118 that the action event was received and the output in response to the action event was provided to the mother. The "I'm Okay" signal can also include a low battery status alert.

Warning device 130 can be recharged wirelessly in eight hours or less while placed on a recharging platform. Furthermore, warning device 130 can be paired with processor 118 by sending a special pairing identification command while placed upon a charging platform, after which warning device 130 confirms with both a wireless response to processor 118 and a visual confirmation to the operator by blinking the status LED indicator rapidly.

In one implementation, warning device 130 is housed in a belt unit that is worn around the mid-section of the mother. The belt unit can contain biometric sensors; for example, the belt unit can contain a heartbeat signal to provide visual indication that the belt unit with warning device 130 is ready to receive a signal and conserving power with the indicator light flashing once every one to five seconds in 50 ms bursts. The belt unit can also contain a temperature sensor to monitor the skin temperature of the mother, a multi-axis gyroscope to monitor relative attitude of the mother, which can be used to determine whether the mother is standing up or lying down, an accelerometer to monitor motion and any changes in motion, which can be used to determine how active the mother is and to approximate the position and directional attitude of the mother, and an RFID for identification. This biometric sensor data can be sent to processor 118 for later analysis or for downloading by the operator. Warning device 130 can be attached to the mother in a number of different manners. Warning device 130 can be configured with an ear tag, worn as an ankle device, surgically implanted, or attached to the skin with medical grade adhesive, stitches, or staples. To the extent that warning device 130 provides an auditory or visual irritation, which does not need to be in contact with the mother for effectiveness, warning device 130 can be positioned proximate to the mother to provide the irritation without irritating other animals.

In another implementation, a master controller 122 can be provided. Master controller 122 can perform all, some, or none of the processing functions of processor 118. In one implementation, master controller 122 can communicate with multiple warning systems 100 in a confinement building. Processor 118 can communicate with master controller 122 over a wired or wireless connection 124. For a wireless connection 124, a Wi-Fi or any other wireless protocol that allows for relatively high bandwidth (64 to 512 Kbps from each processor 118). In one implementation, the 5 GHz frequency band can be used instead of a 2.4 GHz frequency band to minimize interference with other wireless devices in the area.

Master controller 122 can store data received from processor 118, vibratory detector 110, or any other biometric detector that could be used on the feeder or its mother. In this regard, master controller 122 can serve as a database and data-management server for confinement operator, either through applications on master controller 122, or through mobile applications created for the operator to use remotely on a tablet, smartphone or other mobile device.

Master controller 122 can also allow or override likely action events determined by processor 118 when the processor 118 of other warning systems 100 have pending likely action events at approximately the same time to increase the accuracy of each warning system 100. In one implementation, master controller 122 can communicate with processors 118 of other warning systems 100 to receive notifications of impending likely action events. If processor 118 for more than one warning system 100 indicates a likely action event within 100 ms of each other, master controller 122 can query the sound pressure level and timestamp from each warning system 100, and invalidate all but the likely action events originating from warning system 100 with the earliest timestamp. Also, if multiple warning systems 100 communicate a timestamp that is within 2 ms of the earliest timestamp, then master controller 122 can invalidate all the likely action events from each of warning system 100 with such timestamps, except for warning system 100 that communicates the highest sound pressure level.

In another implementation, master controller 122 can communicate wirelessly over connection 125 with each vibratory detector 110 of warning systems 100. Master controller 122 can receive data from each vibratory detector and perform all the various other functions described in warning system 100.

In one implementation, warning system 100 can be provided in portable housing 113 (shown in FIG. 1). In an embodiment where vibratory detector 110 is a microphone, portable housing 113 can comprise a waveguide 600 (shown in FIGS. 6A, 6B) to guide the sound waves to the microphone to improve the accuracy of warning system 100. To further improve the accuracy of warning system 100, two microphones can be used and positioned in waveguide 600 of portable housing 113. With the two microphones, processor 118 can determine a time difference of arrival between the vibratory signals arriving at each of the two microphones to determine a relative position of at least one of the feeders with respect to the two microphones.

Figure 6A:
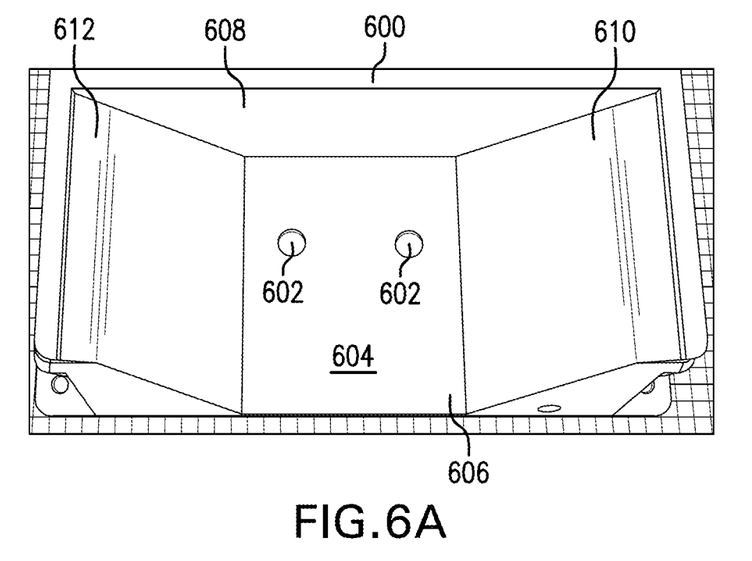
FIG. 6A is a front, perspective view of a waveguide using a fixed angle for the sidewalls of the waveguide, according to an implementation of this disclosure.
Figure 6B:
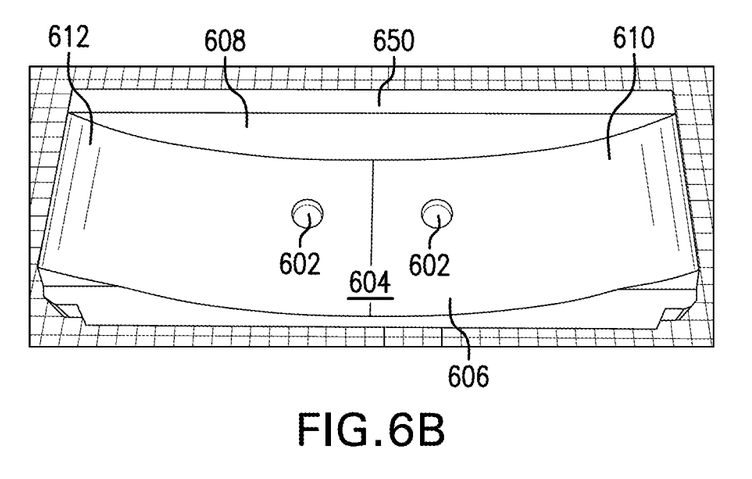
FIG. 6B is a front, perspective view of a waveguide using a varying angle for the sidewalls of the waveguide.

Portable housing 113 with waveguide 600, as shown in FIG. 6A, or waveguide 650, as shown in FIG. 6B, can have two vibratory detectors 110 positioned in corresponding receiving holes 602 in a front surface 604 of waveguide 600. In each implementation, front surface 604 is at the bottom of a recessed area 606 that forms an aural waveguide that can be in the shape of a dome, horn or any other shape that accepts an aural vibratory signal from the front of, and below, waveguide 600 while blocking spurious sounds from the sides and above waveguide 600.

Recessed area 606 of waveguide 600 or waveguide 650 can be bounded at the top by a roof 608 to block noise or other spurious sounds from above waveguide 600. In waveguide 600, recessed area 606 can be bounded by two walls 610, 612. Wall 610 is on the right side of waveguide 600 and is angled away with respect to front surface 604 at an angle slightly greater than zero degrees to ninety degrees (and any angle in between). Wall 612 is on the left side of waveguide 600 and is angled away with respect to front surface 604 at an angle slightly greater than zero degrees to ninety degrees (and any angle in between). The angle of wall 610 and wall 612 should be small enough to accept sounds from the target feeders 104 directly in front of waveguide 600, and up to approximately two feet to the left and right of waveguide 600. The bottom of recessed area 606 can be left open to accept a maximum aural vibratory signal from the target feeders 104 in the area directly in front of and below waveguide 600. Recessed area 606 can be one to four inches deep (and any value in between), but a depth of 2.5 inches and wall 610 and wall 612 each angled at substantially near 45 degrees is particularly advantageous.

In waveguide 650, recessed area 606 can be one to four inches deep (or any value in between), with a preferred depth of 1 inch. Recessed area 606 can also have an angle from the deepest part of recessed area 606 to either wall varying from 180 (or 0) degrees at the deepest part, and decreasing to a minimum angle of 90 degrees at either wall 610, 612, with the preferred minimum angle at each wall 610, 612 of 135 degrees.

In another implementation, portable housing 113 can also contain a temperature sensor and an AC outlet that can be used to plug in a resistive heating device, for example, a heat lamp. The temperature sensor can comprise a P-N junction device with digital output for fast and accurate detection of temperature. The temperature sensor can be physically positioned either on the bottom or side of portable housing 113 to measure the ambient temperature of the floor area of the farrowing pen where the feeders are located. A heat lamp can be controlled by a zero-crossing solid-state relay (SSR/ZC) to change the power level only when the current is zero to minimize electromagnetic interference and also extend the life of the heating device. In this implementation, processor 118 can adjust the power going to the AC outlet and the heating device, with at least three and up to 100 power levels or more from 0-20% for 'full-off' to 90-100% for 'full-on'. Power changes are accomplished gradually by taking at least 30 seconds to go from 'full-off' to 'full-on', and at least 30 seconds to go from 'full-on' to 'full-off'. In one example, the target temperature can be set initially to 88 degrees Fahrenheit. Processor 118 can contain an option for the operator to change the target temperature on-site through the use of two waterproof switches (Up, Down) connected to processor 118 (this could also be done on a user interface on master controller 122). A 2-digit readout can be provided on portable housing 112 to show the ambient temperature or the desired target temperature. The ambient temperature of the farrowing pen can also be stored in non-volatile secondary storage or communicated to master controller 122 for analysis. A user interface on master controller 122 can also show the operator what the relative temperatures are of each farrowing pen in the confinement at any given time, for better reporting and control of the room environment. Comfort lighting could also be provided for times when no heat is needed. The comfort lighting could be provided by one or more LEDs controlled by processor 118 (or master controller 122). This comfort lighting could be aimed at the area where the feeders normally rest to attract them away from the mother to avoid the danger of being laid on, even when there is no need for the heat lamp to be turned on.

Figure 3:
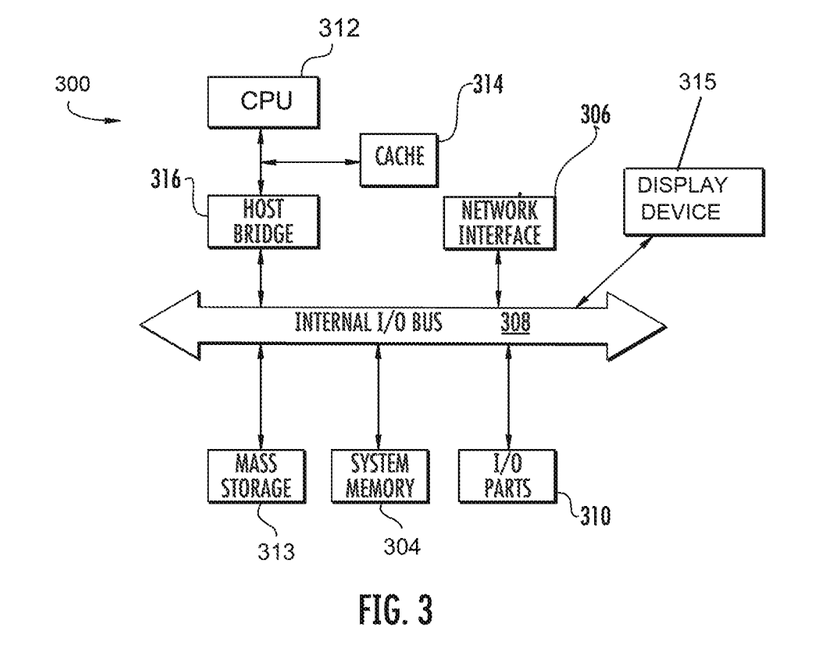
FIG. 3 is a functional block diagram illustrating hardware components of the processor of FIG. 2.

FIG. 3 shows an exemplary computing platform for executing the processing function necessary to derive, calculate, and perform the above functions that are described as being carried out on processor 118 and master controller 122. In one implementation, a processor 300 comprises a system including central processing unit (CPU) 312, a system memory 304, network interface 306 and one or more software applications and drivers enabling or implementing the methods and functions described herein. Hardware system includes a standard I/O bus 308 with I/O Ports 310 and mass storage 313 (which can also be a non-volatile Flash Memory) coupled thereto. Bridge 316 couples CPU 312 to I/O bus 308. The hardware system may further include video memory and display device 315 coupled to the video memory. These elements are intended to represent a broad category of computer hardware systems, including but not limited to general-purpose computer systems based on the Pentium processor manufactured by Intel Corporation of Santa Clara, Calif., as well as any other suitable processor.

Elements of the computer hardware system perform their conventional functions known in the art. In particular, network interface 306 is used to provide communication between CPU 312 and Ethernet networks (or any other network or external device, including master controller 122 or other processors 118). Mass storage 313 can be provided and used to provide permanent storage for the data and programming instructions to perform the above-described functions implementing the test to be carried, whereas system memory 304 (e.g., DRAM) is used to provide temporary storage for the data and programming instructions when executed by CPU 312. I/O ports 310 are one or more serial and/or parallel communication ports used to provide communication between additional peripheral devices, such as ADC 108 and vibratory detector 110.

Processor 300 may include a variety of system architectures, and various components of CPU 300 may be rearranged. For example, cache 314 may be on-chip with CPU 312. Alternatively, cache 314 and CPU 312 may be packed together as a "processor module," with CPU 312 being referred to as the "processor core." Furthermore, certain implementations of the claimed embodiments may not require nor include all the above components. Also, additional components may be included, such as additional processors, storage devices, or memories.

Figure 4:
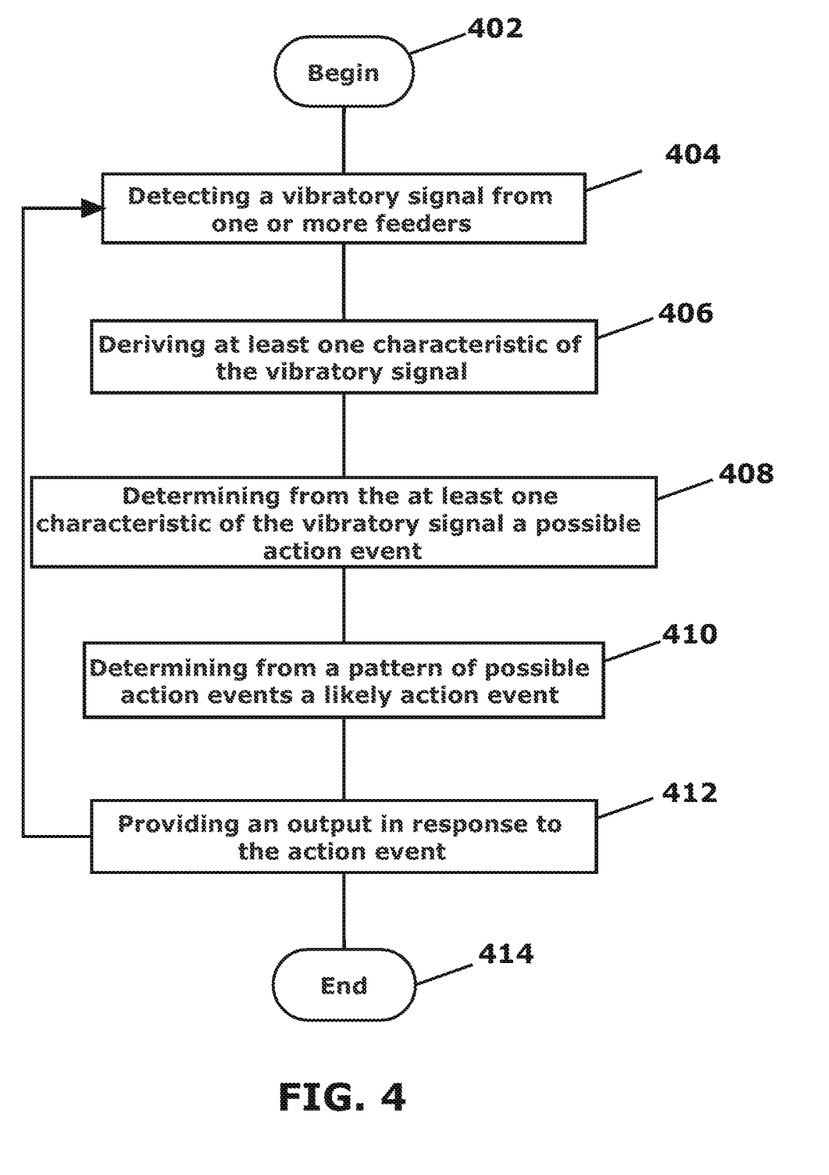
FIG. 4 is a flow chart for processing that can be used for preventing injury to feeders by a mother in an animal farrowing location.

FIG. 4 illustrates a flowchart of overall processing that can be used in systems and methods for preventing injury to feeders by a mother in an animal farrowing location. In 402, processing can begin. In 404, at least one vibratory detector 110 detects a vibratory signal emanating from a feeder 104. In 406, processor 118 derives at least one characteristic the vibratory signal. In 408, processor 118 determines from the at least one characteristic of the vibratory signal a possible action event. In 410, processor 118 determines from a pattern of possible action events a likely action event. In 412, a warning device provides an output in response to the action event. There after the method can repeat or end at 414.

The possible action event can be a squeal from a feeder indicative of the feeder being laid upon by the mother, and the likely action event can be a pattern of squeals and non-squeals indicative of the feeder being laid upon by the mother.

The method can further comprise translating the vibratory signal to a frequency-domain representation of a digitized vibratory signal and deriving therefrom an average sound pressure level, a peak sound pressure level, a plurality of frequency bands, an average magnitude of the plurality of frequency bands, and a peak magnitude of the plurality of frequency bands.

The method can further comprise calculating with processor 118 a relative magnitude of the plurality of frequency bands from the frequency-domain representation of the digitized vibratory signal, and wherein the action event can comprise the peak magnitude of the plurality of frequency bands being at least four times the relative magnitude of the plurality of frequency bands from the frequency-domain representation of the digitized vibratory signal, a peak energy of the frequency-domain representation of the digitized vibratory signal being at least three times the relative magnitude of the plurality of frequency bands from the frequency-domain representation of the digitized vibratory signal, and an average amplitude of the frequency domain representation of the digitized vibratory signal is at least fifty percent greater than an average amplitude for a plurality of prior frequency domain representations of the digitized vibratory signal. The pattern of possible action events can be a predetermined number of cycles comprising a feeder squeal event and a feeder non-squeal event, and wherein the predetermined number of cycles can further comprise an average ratio of the squeal event and the non-squeal event that is at least one and a peak length of a one of the predetermined number of cycles is less than 1.5 times a length of an average of each of the feeder squeal event and the feeder non-squeal event in the predetermined number of cycles.

Reference has been made to several components throughout this disclosure as though each component is a unique component. The various systems, converters, processors and controllers can be incorporated into one or more other systems, converters, processors and controllers thereby reducing the number of components; for example, analog preprocessor 112, ADC 114, TFD converter 116 can reside in processor 118. Other implementations and configurations are also contemplated, as discussed further below.

With respect to vibratory detector 110, the following implementations are also contemplated. In one implementation, vibratory detector 110 is a microphone that is mounted on the inside of the outside wall of portable housing 113 containing warning system 100. The microphone is aimed in the direction of the mother and the feeders feeding on the sow for receiving the audio sound through a hole in the outside wall. In another implementation, two microphones are mounted together as an "xy microphone assembly" at 90 degrees to each other, and located on a physical mounting pylon extending in front of the surface of the outside wall of the housing for warning system 100, and at the midpoint of the outside wall. The microphones are aimed in the direction of the mother and the feeders. This implementation has the effect of increasing sensitivity to audio sounds coming from directly in front of the microphones, compared to any other direction. Alternatively, two microphones can be mounted in an "alternate xy" configuration to the inside face of the outside wall of the housing for warning system 100 for receiving the audio signal through a hole in the wall immediately in front of each microphone, but the wall takes the shape of a "dome" or "horn." Each of the two microphones is mounted at the furthermost point to the left and to the right, respectively for each of the two microphones, of the midpoint of the outside wall, such that each microphone is mounted at a 45-degree angle to the lengthwise plane of the outside wall, so that the plane of each microphone is at a 90-degree angle with the plane of the other microphone.

To increase the signal-to-noise ratio, especially in the direction of the target where the microphone is aimed, the back side of any wall upon which the microphone is mounted, will have a plate of lead or other vibration or resonance-deadening material to reduce the "liveliness" of the wall throughout the audio spectrum, as well as other sound-deadening materials such as, but not limited to, fabric or foam material to attenuate any sound coming from the side or rear direction, with respect to the direction the microphone is aimed.

In another implementation, an omnidirectional microphone is attached directly on the belt unit, which is mounted on the mother. As it is actually attached to the sow, this location will provide the closest location to a laid-on piglet and furthest from piglets in other pens, reducing the incidence of false positives. Alternatively, a directional microphone can be mounted to the inside of the belt worn by the mother, at the point at the top of the belt that is closest to the spine of the mother. This location provides direct transmission of the squeal of the laid-on feeder, through the principle of bone conduction of sound, especially when the feeder's squeal is muffled by the body of the mother when the feeder is completely covered by the mother. In another alternative, a sound horn can be affixed to a directional microphone with the resulting assembly working similarly to a stethoscope, except that it creates an electronic signal and is known as a stethophone. This stethophone is attached to the inside surface of the belt unit worn by the mother in a position that best makes direct contact with the skin of the mother. Because laid-on feeders are also in direct contact with the mother, the squeals from the laid-on feeders will carry a much stronger signal to the stethophone. In this way, signals from any other animal not in direct contact with the mother is much fainter, which virtually eliminates the incidence of false positives.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

The invention claimed is:

1. A warning system for preventing injury to feeders by a mother in an animal farrowing location, the system comprising:
a vibratory detector, wherein the vibratory detector detects a vibratory signal from one or more feeders;
a processor combined to the vibratory detector, wherein the processor receives the vibratory signal and identifies from the vibratory signal at least one characteristic of the vibratory signal that corresponds to a possible action event which is a squeal from a feeder that is indicative of the feeder being laid upon by the mother;
a buffer combined to the processor, wherein the buffer stores a portion of the vibratory signal corresponding to the at least one characteristic of the vibratory signal that corresponds to the possible action event, and wherein the buffer stores a plurality of portions of the vibratory signal corresponding to the at least one characteristic of the vibratory signal that corresponds to a plurality of possible action events;
wherein the processor determines from a pattern of the plurality of possible action events that are stored in the buffer a likely action event which is a pattern of squeals and non-squeals indicative of the feeder being laid upon by the mother, and wherein the pattern of possible action events is a predetermined number of cycles between a feeder squeal event and a feeder non-squeal event, in order to reduce false positives from acting strictly on a single possible action event; and
a warning device in communication with the processor, wherein the warning device provides an output in response to the likely action event.

2. The warning system of claim 1, wherein the at least one characteristic of the vibratory signal comprises at least one chosen from a frequency and a magnitude of the vibratory signal.

3. The warning system of claim 1, and further comprising an analog-to-digital converter ("ADC") for digitizing the vibratory signal from the vibratory detector and creating a digitized vibratory signal and a time-to-frequency domain ("TFD") converter for converting the digitized vibratory signal to a frequency domain representation of the digitized vibratory signal.

4. The warning system of claim 3, and further comprising a clock for providing a timing information for the frequency domain representation of the digitized vibratory signal.

5. The warning system of claim 4, wherein the frequency domain representation of the digitized vibratory signal comprises of an average sound pressure level, a peak sound pressure level, the timing information, a plurality of frequency bands, an average magnitude of the plurality of frequency bands, and a peak magnitude of the plurality of frequency bands.

6. The warning system of claim 5, wherein the frequency domain representation of the digitized vibratory signal comprises an average target magnitude comprising an average magnitude of a predefined targeted band of frequencies.

7. The warning system of claim 6, wherein the predefined targeted band of frequencies is between 1500 HZ and 4500 HZ.

8. The warning system of claim 5, wherein the processor calculates a relative magnitude of the plurality of frequency bands from the frequency domain representation of the digitized vibratory signal, and wherein the likely action event comprises the peak magnitude of the plurality of frequency bands being a multiple of the relative magnitude of the plurality of frequency bands from the frequency domain representation of the digitized vibratory signal, a peak energy of the frequency domain representation of the digitized vibratory signal is a multiple of the relative magnitude of the plurality of frequency bands from the frequency domain representation of the digitized vibratory signal, and an average amplitude of the frequency domain representation of the digitized vibratory signal is greater than an average amplitude for a plurality of prior frequency domain representations of the digitized vibratory signal.

9. The warning system of claim 1, wherein the pattern of possible action events is a predetermined average number of cycles per second, wherein each cycle comprising a feeder squeal event and a feeder non-squeal event.

10. The warning system of claim 9, wherein the predetermined average number of cycles per second is at least five-sixths and less than or equal to two-and-one-half, for a period of time not less than five seconds and not more than fifteen seconds.

11. The warning system of claim 10, wherein the predetermined number of cycles further comprises an average ratio of the squeal event to the non-squeal event is at least one and a peak length of one of the predetermined number of cycles is less than 1.5 times a length of an average of each of the feeder squeal event and the feeder non-squeal event in the predetermined number of cycles.

12. The warning system of claim 1, wherein the warning device is a belt worn by the mother, wherein the output is a multi-stage output wherein a first stage output is an initial irritation to the mother, wherein a second stage output is a stronger irritation, wherein the irritation is a vibration or electric shock.

13. The warning system of claim 12, wherein the warning device comprises a bi-directional transceiver for communication with the processor for communicating to the processor an "I'm Okay" signal indicative of the warning device functioning properly.

14. The warning system of claim 13, wherein the I'm Okay signal provides a confirmation to the processor that the likely action event was received and the output in response to the likely action event was provided to the mother, and wherein the I'm Okay signal includes a low battery status alert.

15. The warning system of claim 1, and further comprising a portable housing for the vibratory detector and the processor, wherein the portable housing comprises of a waveguide, and where the vibratory detector comprises two microphones positioned in the waveguide, and the waveguide comprises of a recessed area converging on a front surface in a front of the waveguide and a left wall and a right wall with each of the left wall and the right wall at substantially a forty five degree angle with respect to the front surface and a depth of the recessed area of substantially near 2.5 inches.

16. The warning system of claim 15, wherein the processor further determines a time difference of arrival between the vibratory signal arriving at each of the two microphones to determine a relative position of at least one of the feeders with respect to the two microphones.

17. The warning system of claim 1, wherein the vibratory detector is in direct contact with the mother to detect the vibratory signal from the feeders through the mother.

18. The warning system of claim 17, wherein the vibratory detector is a stethophone.

19. A method for preventing injury to feeders by a mother in an animal farrowing location, the method comprising:
   detecting with a vibratory detector a vibratory signal from one or more feeders;
   receiving from the vibratory detector the vibratory signal;
   identifying with a processor at least one characteristic of the vibratory signal that corresponds to a possible action event being a squeal from a feeder indicative of the feeder being laid upon by the mother;
   storing in a buffer the at least one characteristic of the vibratory signal that corresponds to a possible action event;
   continuing to receive, identify, and store in the buffer a plurality of portions of the vibratory signal corresponding to the at least one characteristic of the vibratory signal that corresponds to the possible action events;
   determining with the processor from a pattern of the plurality of possible action events that are stored in the buffer a likely action event being a pattern of squeals and non-squeals indicative of the feeder being laid upon by the mother based on the vibratory signal that is stored in the buffer to reduce false positives from acting strictly on the characteristic of the vibratory signal corresponding to the possible action event, wherein the pattern if possible action events is a predetermined number of cycles between a feeder squeal event and a feeder non-squeal event; and
   providing with a warning device an output in response to the likely action event.

20. A method for preventing injury to feeders by a mother in an animal farrowing location, the method comprising:
   detecting with a vibratory detector a vibratory signal from one or more feeders;
   deriving with a processor at least one characteristic of the vibratory signal;
   determining with the processor from the at least one characteristic of the vibratory signal a possible action event;
   determining with the processor from a pattern of possible action events a likely action event;
   providing with a warning device an output in response to the likely action event;
   translating the vibratory signal to a frequency domain representation of a digitized vibratory signal and deriving therefrom an average sound pressure level, a peak sound pressure level, a plurality of frequency bands, an average magnitude of the plurality of frequency bands, and a peak magnitude of the plurality of frequency bands;
   and calculating with the processor a relative magnitude of the plurality of frequency bands from the frequency domain representation of the digitized vibratory signal, and wherein the action event comprises the peak magnitude of the plurality of frequency bands being a multiple of the relative magnitude of the plurality of frequency bands from the frequency domain representation of the digitized vibratory signal, a peak energy of the frequency domain representation of the digitized vibratory signal being a multiple of the average magnitude of the plurality of frequency bands from the frequency domain representation of the digitized vibratory signal, and an average magnitude of the frequency domain representation of the digitized vibratory signal is greater than an average magnitude for a plurality of all frequency domain representations of the digitized vibratory signal;
   wherein the possible action event is a squeal from a feeder indicative of the feeder being laid upon by the mother, and wherein the likely action event is a pattern of squeals and non-squeals indicative of the feeder being laid upon by the mother; and wherein the pattern of possible action events is a predetermined number of cycles between a feeder squeal event and a feeder non-squeal event, and wherein the predetermined number of cycles further comprises an average ratio of the squeal event and the non-squeal event is at least one and a peak length of a one of the predetermined number of cycles is less than 1.5 times a length of an average of each of the feeder squeal event and the feeder non-squeal event in the predetermined number of cycles.

* * * * *